(12) United States Patent
Hahn

(10) Patent No.: US 11,325,543 B2
(45) Date of Patent: May 10, 2022

(54) COVER DEVICE FOR A SIDE SILL OF A PASSENGER VEHICLE

(71) Applicant: Daimler AG, Stuttgart (DE)

(72) Inventor: Samuel Hahn, Boeblingen (DE)

(73) Assignee: Daimler AG, Stuttgart (DE)

( * ) Notice: Subject to any disclaimer, the term of this patent is extended or adjusted under 35 U.S.C. 154(b) by 72 days.

(21) Appl. No.: 16/980,082

(22) PCT Filed: Dec. 4, 2018

(86) PCT No.: PCT/EP2018/083413
§ 371 (c)(1),
(2) Date: Sep. 11, 2020

(87) PCT Pub. No.: WO2019/174768
PCT Pub. Date: Sep. 19, 2019

(65) Prior Publication Data
US 2021/0016724 A1    Jan. 21, 2021

(30) Foreign Application Priority Data
Mar. 13, 2018 (DE) .................... 10 2018 001 993.5

(51) Int. Cl.
*B60R 13/04* (2006.01)
*B62D 25/02* (2006.01)
*B62D 35/00* (2006.01)

(52) U.S. Cl.
CPC ............ *B60R 13/04* (2013.01); *B62D 25/025* (2013.01); *B60R 13/043* (2013.01); *B60R 2013/046* (2013.01); *B62D 35/008* (2013.01)

(58) Field of Classification Search
CPC . B60R 13/04; B60R 13/043; B60R 2013/046; B62D 25/025; B62D 35/008
See application file for complete search history.

(56) References Cited

U.S. PATENT DOCUMENTS 5,678,872 A * 10/1997 Slater ................. B60R 3/02
292/35
6,158,756 A * 12/2000 Hansen ................ B60R 3/02
280/166

(Continued)

FOREIGN PATENT DOCUMENTS

DE        36 13 301 A1   10/1987
DE   10 2004 045 382 A1    3/2006

(Continued)

OTHER PUBLICATIONS

PCT/EP2018/083413, International Search Report dated Feb. 1, 2019 (Two (2) pages).

*Primary Examiner* — Gregory A Blankenship
(74) *Attorney, Agent, or Firm* — Crowell & Moring LLP

(57) ABSTRACT

A cover device for a side sill of a passenger vehicle has a sill cover which includes first and second cover elements which are arranged in a length region of the side sill below a door opening and are coupled moveably to one another and a drive unit via which the cover elements are jointly displaceable between a first functional position and a second functional position. The first cover element is pivotable about a first axis and the second cover element is displaceable about a second axis. The second cover element is mounted so as to pivot about the second axis by a bearing device on the first cover element. The displacement movement of the second cover element relative to the first cover element is positively controlled by a slotted link.

12 Claims, 7 Drawing Sheets

(56) References Cited

U.S. PATENT DOCUMENTS

| | | | | |
|---|---|---|---|---|
| 6,742,835 | B1* | 6/2004 | Floarea | B60R 13/04 |
| | | | | 296/203.03 |
| 8,136,826 | B2* | 3/2012 | Watson | B60R 3/002 |
| | | | | 280/166 |
| 8,602,467 | B2* | 12/2013 | Lee | B60R 3/02 |
| | | | | 293/106 |
| 9,481,396 | B2* | 11/2016 | Jachowski | B62D 35/008 |
| 9,701,249 | B2* | 7/2017 | Leitner | B60R 3/02 |
| 9,944,231 | B2* | 4/2018 | Leitner | B60R 3/02 |
| 10,150,419 | B2* | 12/2018 | Derbis | B60R 3/02 |
| 10,654,418 | B2* | 5/2020 | He | B60R 3/02 |
| 10,814,790 | B2* | 10/2020 | Meszaros | B60R 3/005 |
| 11,001,208 | B2* | 5/2021 | Hahn | B60R 13/04 |
| 2004/0100063 | A1* | 5/2004 | Henderson | B60R 3/002 |
| | | | | 280/166 |
| 2005/0179227 | A1* | 8/2005 | Leitner | B60R 3/002 |
| | | | | 280/163 |
| 2005/0258616 | A1* | 11/2005 | Scheuring, III | B60R 3/002 |
| | | | | 280/166 |
| 2008/0054586 | A1* | 3/2008 | Lechkun | B60R 3/02 |
| | | | | 280/166 |
| 2008/0179920 | A1* | 7/2008 | Watson | B60R 3/002 |
| | | | | 296/209 |
| 2014/0180546 | A1* | 6/2014 | Cha | B60R 3/02 |
| | | | | 701/49 |
| 2016/0137134 | A1* | 5/2016 | Nania | B60R 3/02 |
| | | | | 280/164.1 |
| 2019/0366947 | A1* | 12/2019 | Hahn | B60R 13/04 |
| 2021/0016724 | A1* | 1/2021 | Hahn | B62D 25/2072 |

FOREIGN PATENT DOCUMENTS

| | | |
|---|---|---|
| DE | 10 2009 031 534 A1 | 2/2010 |
| DE | 10 2012 018 284 A1 | 3/2013 |

* cited by examiner

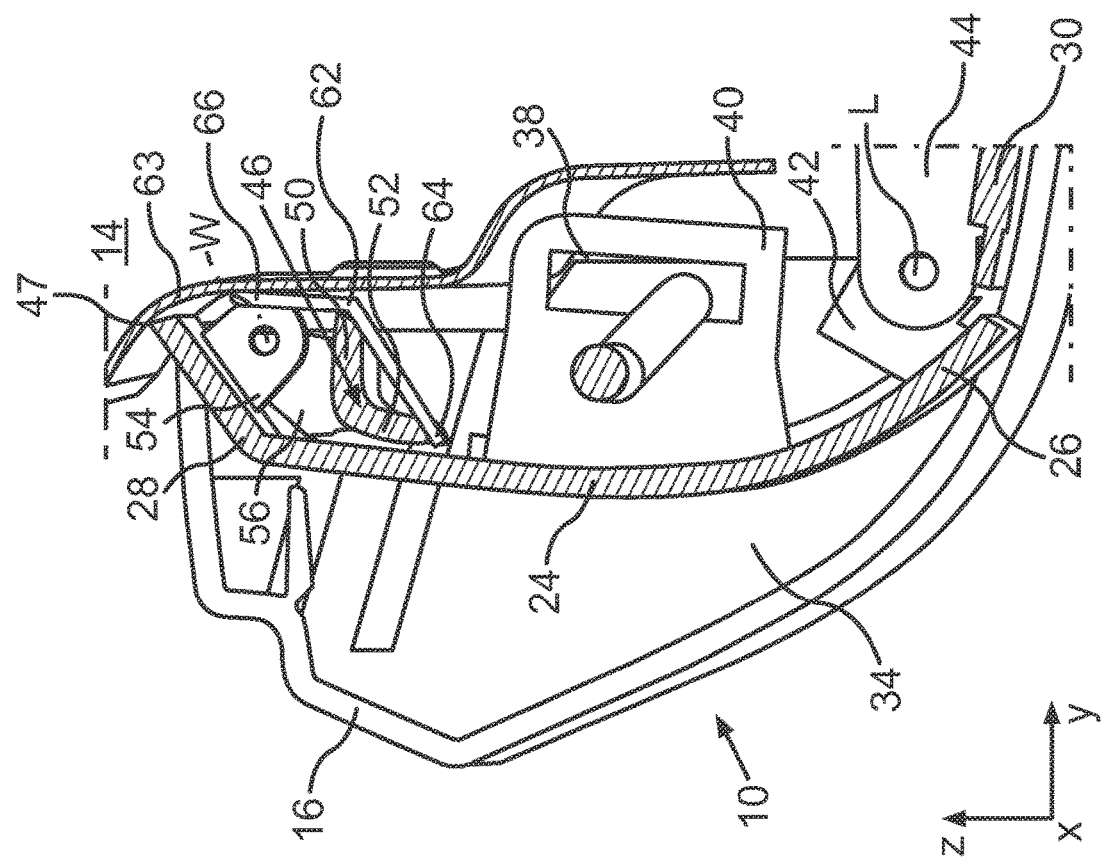
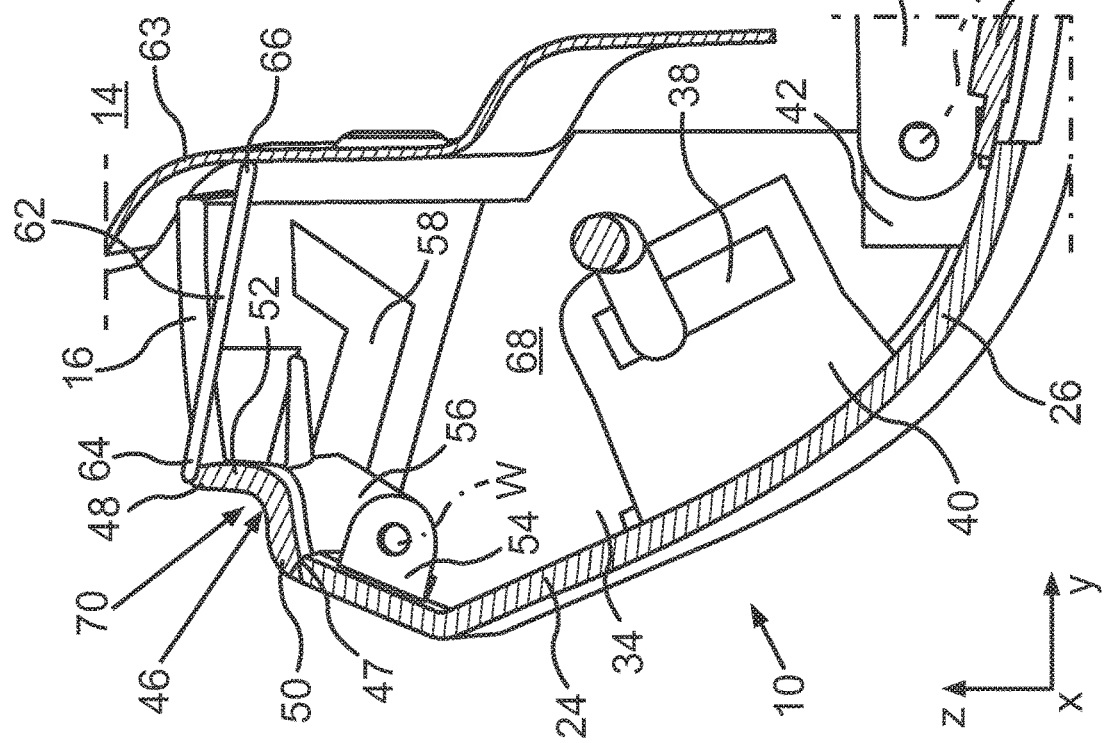

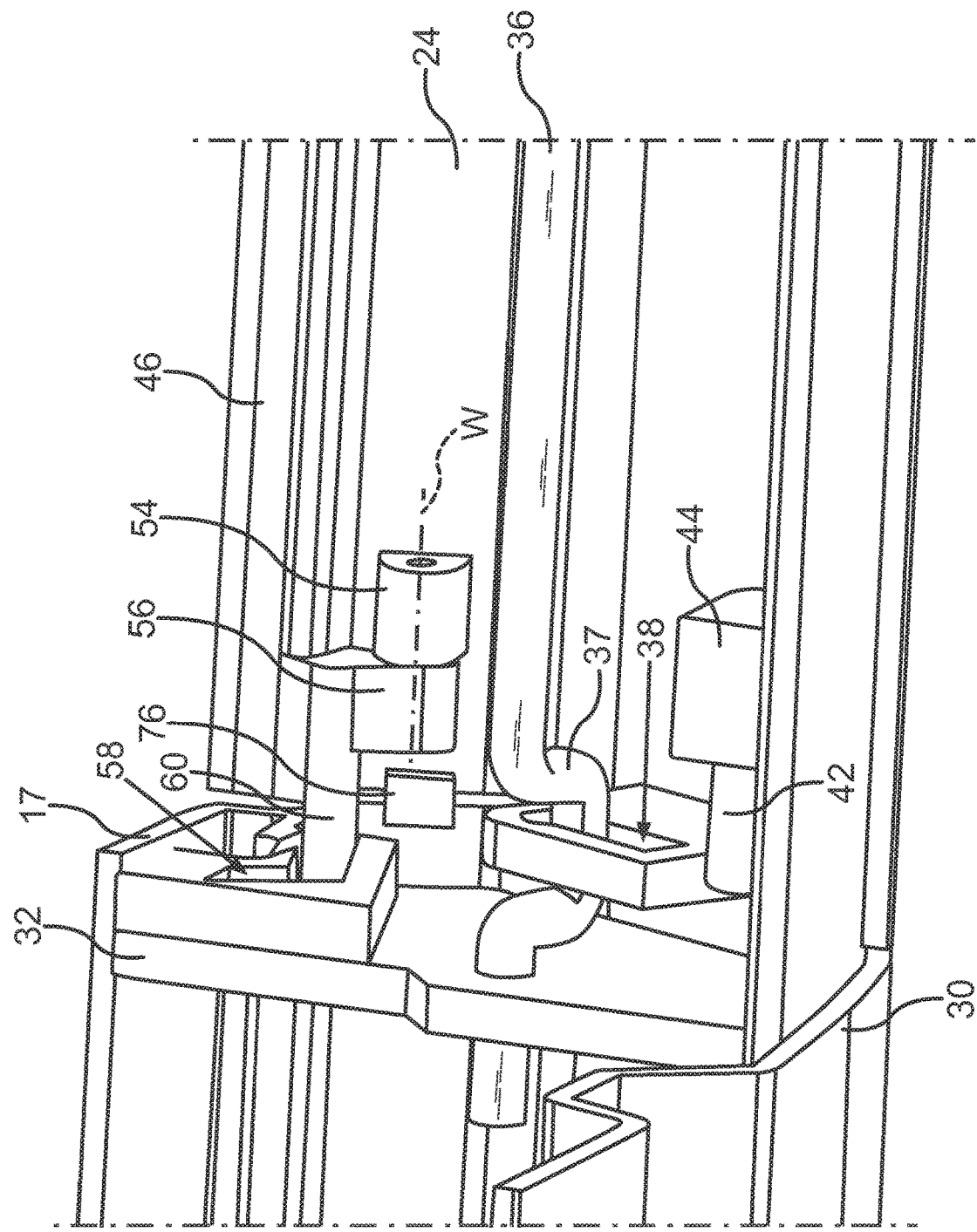

COVER DEVICE FOR A SIDE SILL OF A PASSENGER VEHICLE

BACKGROUND AND SUMMARY OF THE INVENTION

The invention relates to a cover device for a side sill of a passenger vehicle. The invention further relates to a passenger vehicle.

In side sills of passenger vehicles, a cover device is customarily provided, which comprises a sill cover which extends inter alia into the region below a door opening and which projects outwards beyond the lower door edge in the transverse direction of the vehicle or is at least flush therewith. Such an extension of the respective sill cover is required in order to protect the side door and in particular the lower door edge thereof from stone chips and dirt from underneath.

However, the described desirable extension of the sill cover outwards in the transverse direction of the vehicle gives rise to the problem in the region of the respective door opening that this considerably impedes continuously increasing requirements in terms of ergonomics and the comfort of vehicles, in particular regarding ease of entry and exit. In particular, upon entry and exit, this leads to the sill cover below the door opening getting in the way of the respective passenger's legs, which can lead to reduced comfort, especially for older people or people with reduced mobility. This problem is also exacerbated for example when the vehicle door cannot be opened widely in narrow parking situations.

Arranging an inherently rigid outer cover element below a corresponding door opening of a vehicle body, which cover element is displaceable between a covering position, which the cover element adopts when the vehicle is in operation, and an entry position, which the cover element should adopt in particular when the vehicle is being entered or exited, is already known from DE 10 2009 031 534 A1. This known cover device thus makes it possible to generally solve the problem of, on the one hand, adequately covering or at least coming flush with a lower edge of a respective side door in the transverse direction of the vehicle in order thereby to ensure appropriate protection against corrosion and dirt and, on the other hand, simplifying entry to and exit from the vehicle by displacing the cover element.

A sill cover is also known from DE 10 2012 284 A1, which comprises at least one cover part secured on the sill and at least one cover element made from a flexible material and which is arranged to be mobile in a length region of the side sill below a door. The mobile cover element is displaceable between a covering position and an entry position by means of a drive unit.

DE 10 2004 045 382 A1 discloses a motor vehicle with a side sill which is provided with an external side cover provided in the region of a door opening which can be opened and closed by means of a vehicle side door, which side cover is articulated on the side sill by means of a four-pivot linkage having a plurality of connecting rods so as to be pivotable about an axis and is thus displaceable between an operative position, in which it improves the aerodynamic properties of the motor vehicle, and an entry position, which is assumed when the vehicle side door is open and in which, viewed in the transverse direction of the vehicle, the side sill is narrower than in the operative position, such that the entry and exit of a passenger through the door opening is made easier. The pivoting of the side cover is forced by moving the vehicle side door. To this end, the four pivot linkage is mechanically coupled to a door hinge axle. The end of the pivoting movement of the side cover is effected by the latter stopping against the side sill.

DE 36 13 301 A1 discloses a side cover for passenger vehicles which covers at least the region of lateral sills. The side cover has a plurality of predetermined bending points each forming an integral hinge and is thereby displaceable by means of an actuating drive into an extended operative position, which has a beneficial effect on the aerodynamics of the passenger vehicle, and into a folded-up non-operative position.

A common feature to all known cover devices is that they have a relatively large installation space requirement and/or a complex, cost-intensive construction and are nonetheless only of limited use as entry or exit aid, because the space which can be freed up for entry or exit is usually only small.

The object of the present invention is to produce a cover device of the type mentioned at the outset, which has a simple construction which saves on installation space and is easy to install. A further object consists in providing a corresponding passenger vehicle with such a cover device.

The cover device according to the invention for a side sill of a passenger vehicle has a sill cover that comprises first and second cover elements which are arranged in a length region of the side sill below a door opening and are coupled moveably to one another. Furthermore, a drive unit is provided, for the joint adjustment of the first and second cover elements between a first functional position and a second functional position and/or the second functional position and the first functional position. While the first cover element is pivotable about a first axis L, the second cover element is pivoted about a second axis W. The cover device is characterised in that the second cover element is mounted so as to pivot about the second axis W by means of a bearing device on the first cover element, and in that the displacement movement of the second cover element relative to the first cover element is controlled by means of a slotted link. The second cover element can therefore not move freely relative to the first cover element, but rather is forcibly pivoted relative to the first cover element in a targeted manner such that both cover elements can be displaced into a space-saving position in which they free up a preferably almost maximum space for easy and comfortable entry and exit.

The first functional position of the sill cover is preferably what is referred to as a covering or operative position, in which it optionally improves the aerodynamic properties of the motor vehicle and protects the door edges from stone chips and the like. In the second functional position of the sill cover, which is also referred to as comfort or entry position, the associated vehicle side door is at least partially opened. As a result of the first and second cover elements being pivoted or retracted into one another, the width of the side sill to be negotiated by a person entering and exiting the vehicle is narrower, viewed in the transverse direction of the vehicle, than in the first functional position.

According to a development of the invention, it is provided that the bearing device comprises a coupler which is mounted so as to pivot about the second axis W on the first cover element and is connected to the second cover element. The coupler is thus a member for connecting the second cover element to the second axis W, which is thus held at a distance from the second axis V. The coupler can therefore also readily be referred to as an articulated lever, because this is accordingly mounted—preferably at one end—so as to move by pivoting, and has the second cover element at a distance from the articulation. Here, the coupler can be formed as a separate part which is provided with the second cover element or on which the second cover element is secured. Another exemplary embodiment provides that the coupler and the second cover element are formed as one part, for example by them being manufactured as one part, for example by means of an injection moulding process.

In one advantageous development of the cover device, it is provided that the coupler is guided by means of the slotted link. The coupler guided in this way is thus a connecting rod or gear link, which ultimately only pivots back and forth along the specified movement path of the coupler when the sill cover is displaced back and forth between the two functional positions. This configuration can be manufactured in a cost-effective manner and is also tail-safe, because a relatively precise movement of the sill cover can be easily produced.

In a preferred embodiment of the cover device, it is provided that the slotted link has at least one guide portion which—viewed in the longitudinal direction of the vehicle, i.e., in the x direction, using the coordinate system customarily used in vehicle construction—runs obliquely downwards from the outside at the top towards the vehicle center. The guide portion of the slotted link is thus designed inclined relative to a horizontal plane extending in the x and y direction such that, when the sill cover is displaced from the first functional position into the second functional position, the second cover element is virtually pivoted down or folded down from a higher position—viewed in the vertical direction of the vehicle (z direction)—to a lower position. This makes it possible to produce a particularly compact arrangement of the two cover elements relative to one another in the second functional position.

Particular preference is given to an exemplary embodiment of the cover device in which the slotted link is provided with a bearing web arranged in a positionally fixed manner relative to the side sill. This bearing web is thus immobile relative to the side sill and enables precise control of the movement of the sill cover. This type of movement control is particularly impervious to positional tolerances.

Furthermore, an exemplary embodiment is preferred in which the second axis W is provided in a static manner on the first cover element. The second cover element is thus mounted exclusively so as to pivot on the first cover element, and upon displacement of the first cover element about the first axis L, it is moved (together) translationally h the first cover element. Upon displacement of the first and second cover elements between the two functional positions, the first cover element is exclusively pivoted, while the second cover element mounted thereon performs a combined translational and pivoting movement.

In a particularly preferred embodiment of the cover device, the first cover element is displaceable about the first axis L along an arcuate path with the radius R, wherein the arcuate path intersects the slotted link. The movement paths thus intersect. In this type of displacement of the two cover elements, the first axis L is preferably located in a lower region of the sill cover near the roadway, such that, when the first cover element is pivoted, a gap—preferably opening upwards—between it and a body element, for example a portion of the sill or a side wall portion placed on the side sill, becomes smaller or larger.

It is preferably shared by all variant embodiments of the cover device according to the invention that the two bearing axes L and W are arranged at a distance from one another and are located at different height levels relative to the vertical direction of the vehicle (z direction), Both axes L and W run parallel, preferably at least approximately parallel to one another and also to the longitudinal axis of the vehicle (x direction).

In order to produce a compact arrangement of the two cover elements in the second functional position, one advantageous exemplary embodiment of the cover device provides that, in the first functional position of the sill cover, i.e., virtually in the starting position, the second axis W is arranged below the slotted link. This makes it possible to produce a very large pivot angle for the coupler having the second cover element, and hence an at least approximately as large as possible adjustment of the second cover element relative to the first cover element.

It is furthermore provided that, in the second functional position of the sill cover, the second axis W is arranged above the guide portion of the slotted link which runs obliquely downwards. This guide portion of the coupler, which guides from the first to the second functional position, is preferably straight, such that a linear guide is formed. This is characterised in that, upon displacement of the sill cover between the first and second functional positions, a point, preferably any point of the coupler, is guided on an at least approximately straight path.

The kinematics of the cover device according to the invention are preferably designed such that, upon a displacement of the sill cover from the first functional position into the second functional position and/or from the second functional position into the first functional position, both cover elements each pivot in the same direction about the respective axis L or W. Unlike the prior art, the cover elements do not fold into each other in the form of overlapping, Which can have advantages in terms of noise during operation.

Finally, an exemplary embodiment of the cover device is preferred in which both cover elements are designed as dimensionally stable, i.e., inherently rigid structures which, unlike a mesh, woven fabric, knitted fabric or the like, do not need to be stretched in order to obtain or retain their shape. This has particular advantages also in terms of improved aerodynamics in driving operation.

Further advantageous variant embodiments of the cover device are found in the following description of the Figures, optionally in combination with the drawings.

In order to solve the object, a passenger vehicle is also proposed, having a side sill, also referred to as lateral side member, wherein the side sill is provided with a cover device according to the invention. Preferably, the second side sill arranged on the opposite side of the vehicle is also provided with such a cover device.

Hereinafter, an advantageous exemplary embodiment of the cover device according to the invention is described in more detail using the drawings.

BRIEF DESCRIPTION OF THE DRAWINGS

FIG. 8 is a cross-sectional view through the cover device according to FIGS. 3 to 7, wherein the cover elements are shown in the covering position and a flexible cover element is provided, one end of which is arranged on the inherently rigid first cover element through the intermediary of the inherently rigid second cover element in the form of an angular strip member, and another end of the flexible cover element is arranged on a body member;

FIG. 9 is a sectional view through the cover device analogous to FIG. 8, wherein the first and second cover elements are arranged in the entry position and hence the flexible cover element is accordingly displaced together therewith;

FIG. 13 is a perspective depiction of a section of the cover device according to FIGS. 1 to 12 in the region of a path-limiting element provided.

DETAILED DESCRIPTION OF THE DRAWINGS

Figure 1:
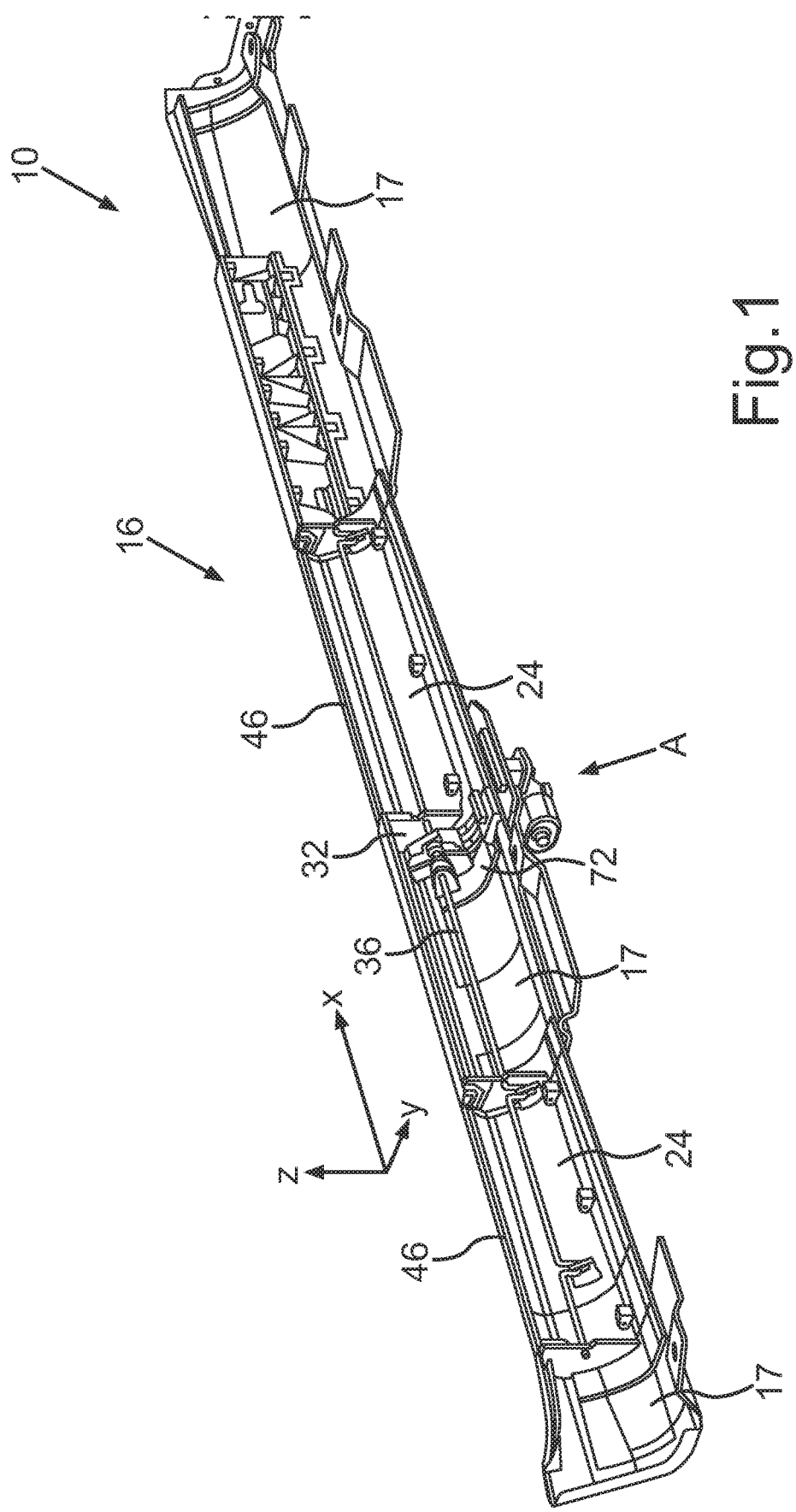
FIG. 1 is a perspective view of a cover device for a side sill of a passenger vehicle having a sill cover having a cover element secured to the sill and respective mobile cover elements arranged below an associated door opening and having a drive unit for adjusting the mobile cover elements, which is designed as a pre-assembled structural unit and is arranged in the region of the cover element secured to the sill by means of a holding device.

Identical or functionally identical parts are provided with the same reference numerals in the Figures.

FIG. 1 shows a perspective depiction of an exemplary embodiment of a cover device of a side sill 10, also referred to as lateral side member, of a passenger vehicle, which comprises a sill cover 16 with respective cover elements 17 secured to the sill and respective mobile first cover elements 24 arranged below a respective associated door opening 14 (FIG. 2) for a front or rear side door 12 (FIG. 2), which cover elements are adjustable in further ways, described in more detail, by means of a drive unit A (FIGS. 10-12), The drive unit A is here designed as a pre-assembled structural unit and is arranged between the two mobile first cover elements 24 by means of a holding device 72 in the region of the cover element 17 secured to the sill.

It is readily clear that the sill cover 16 depicted in the Figures is designed for a vehicle which has at least two entry doors on a vehicle side, wherein each door opening is assigned a mobile first cover element 24. In another exemplary embodiment of the cover device, not shown in the Figures, the sill cover 16 has only one such mobile first cover element 24, preferably assigned to the driver or passenger door, and at least one cover element 17 secured to the sill, regardless of whether the vehicle has only one or two doors on each side. The cover element(s) 17 secured to the sill then cover the remaining part of the sill to the left and right, or in front of and/or behind, the mobile first cover element 24.

Figure 2:
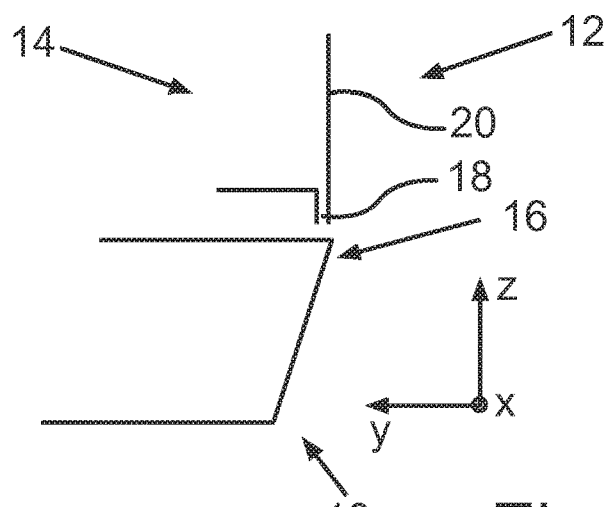
FIG. 2 is a schematic sectional view through the cover device and a side door of a passenger vehicle along a sectional plane running in the transverse direction of the vehicle or in the vertical direction of the vehicle, wherein the sill cover of the side sill is arranged, in the transverse direction of the vehicle, covering or flush with the associated lower door edge of the side door.

FIG. 2 depicts a highly schematic sectional view along a sectional plane running in a vertical direction of the vehicle (z direction) or transverse direction of the vehicle (y direction) of the sill cover 16 for the side sills 10, not shown in more detail, which in the case of a self-supporting passenger car body are each arranged longitudinally below the door entry or door entries between the front and rear wheel arches, and the side door 12 for closing a corresponding door opening 14, which side door is arranged above the side sills and can be seen in sections. It can be seen here that the sill cover 16 extends outwards in the transverse direction of the vehicle (y) to the extent that—in the closed state of the side door 12—it projects beyond an associated lower door edge 18 or an outer cover 20 of the side door 12, or at least ends flush therewith. Such an extension of the outer sill cover 16 has the advantage that—in relation to the vehicle transverse (y-direction)—covering the underside of the lower door edge 18 or the entire side door 12 makes it possible to prevent damage from stone chips or general soiling of the lower door edge 18 or an entire lower region of the side door 12.

The general configuration of the side sill 10 described and in particular of the outer sill cover 16, however, raises the problem of a more difficult entry to and exit from the vehicle via the door opening 14, in particular for smaller and/or older people or for people with reduced mobility. In this case, the problem is exacerbated when the vehicle door 12 cannot be opened widely enough in narrow parking situations. In particular in such situations, this can lead to uncomfortable entry and exit and to associated dirtying of clothing, especially trouser legs.

FIGS. 3 to 7 show respective perspective views, and FIGS. 8 and 9 show respective sectional views, along a sectional plane running in the vertical direction of the vehicle (z direction) or transverse direction of the vehicle (y direction) of the sill cover 16 described in conjunction with FIG. 1 and FIG. 2, which is formed for example from a plastic material and by means of which a body-in-white body element 63 (FIGS. 8, 9), which can be the side sill and/or part of a side wall of the motor vehicle, is covered or overlapped outwards or downwards, i.e., in the transverse direction of the vehicle (y direction) and in the vertical direction of the vehicle (z direction).

Figure 3:
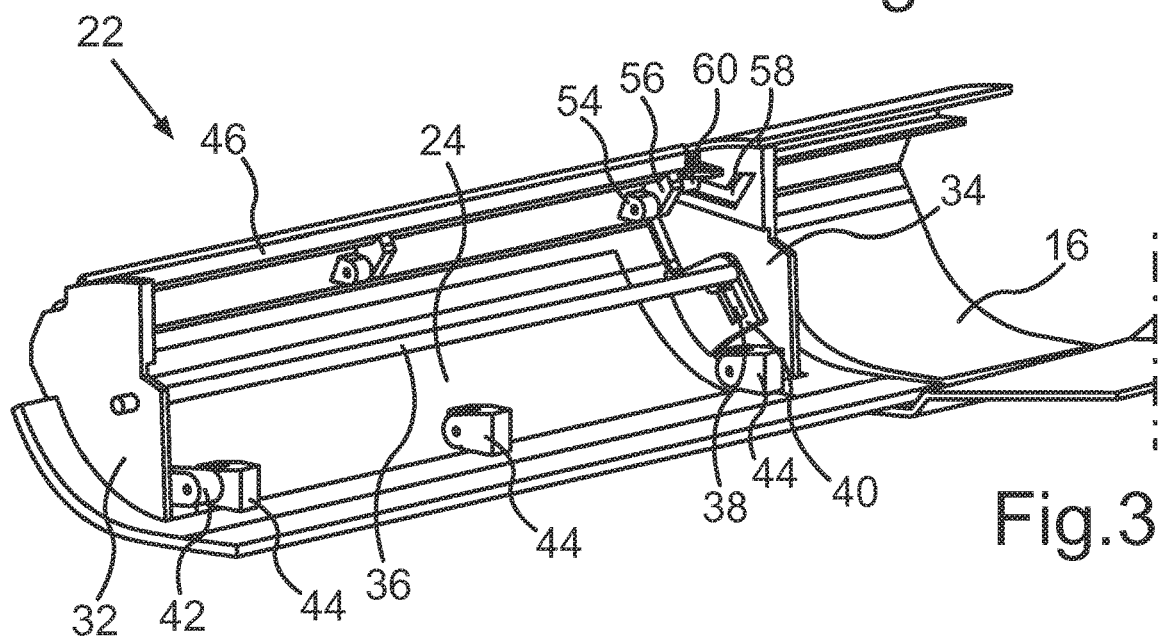
FIG. 3 is a perspective view of the mobile cover elements arranged in a length region of the side sill below a door opening, which in the present case are arranged in a covering position, out of which they are displaceable into an entry position.
Figure 4:
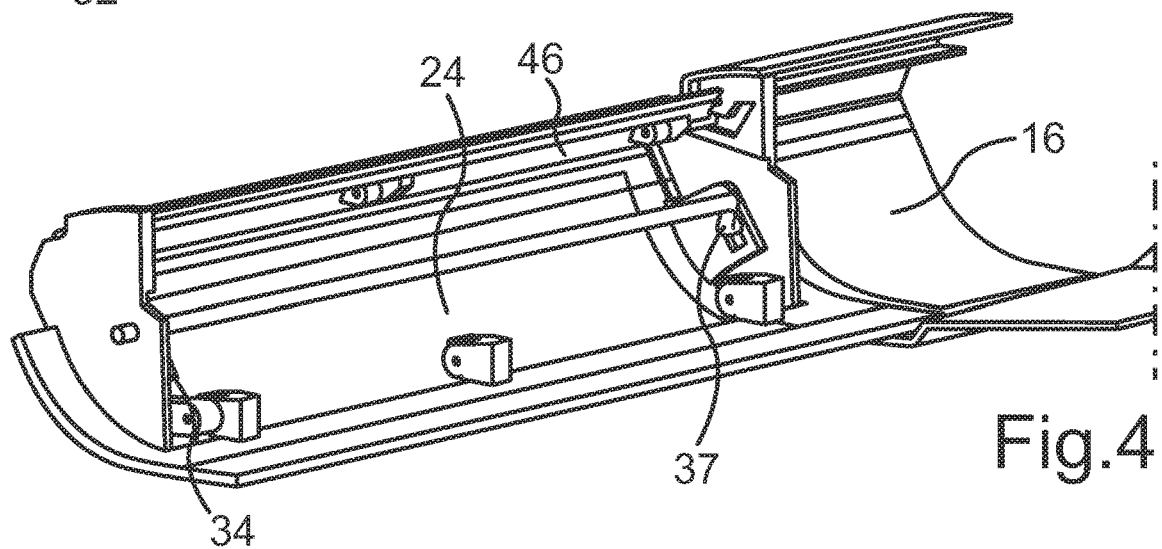
FIG. 4 is a perspective view of the cover device analogous to FIG. 3, wherein the mobile cover elements are shown in an initial position of their displacement movement from the covering position into the entry position.
Figure 5:
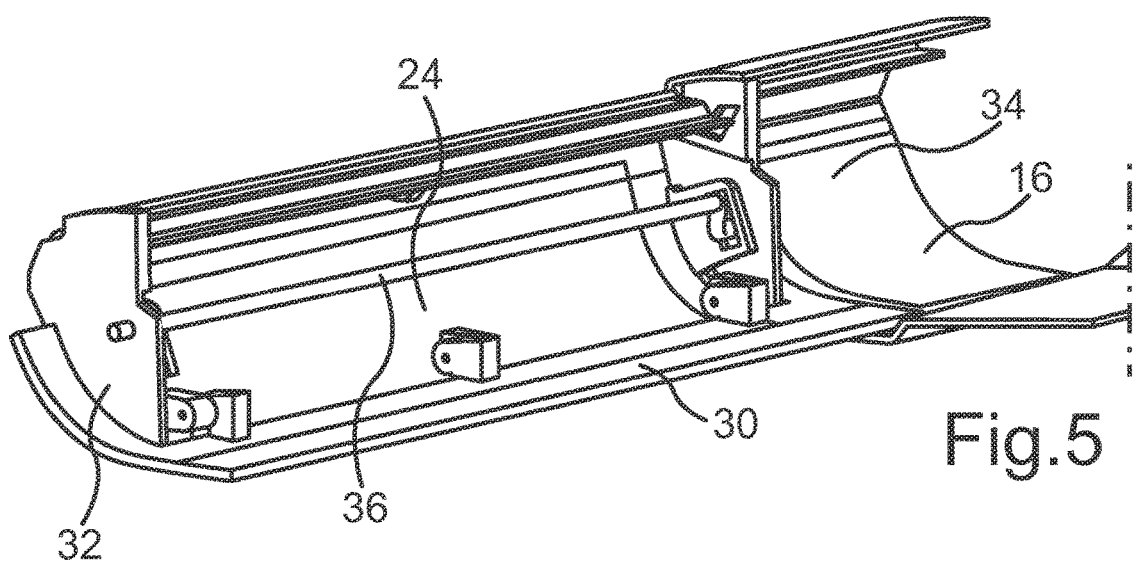
FIG. 5 is a perspective view of the cover device according to FIGS. 3 and 4 in the further course of the displacement movement of the mobile cover elements from the covering position into the entry position.
Figure 6:
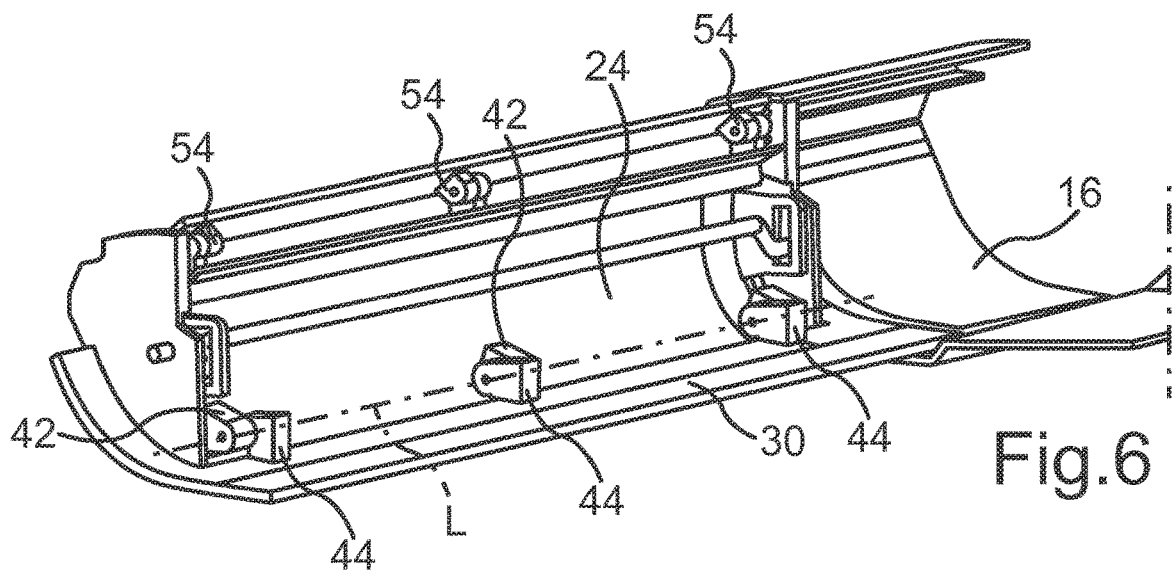
FIG. 6 is a perspective view of the cover device analogous to FIGS. 3 to 5, wherein the cover elements are shown shortly before reaching the entry position.
Figure 7:
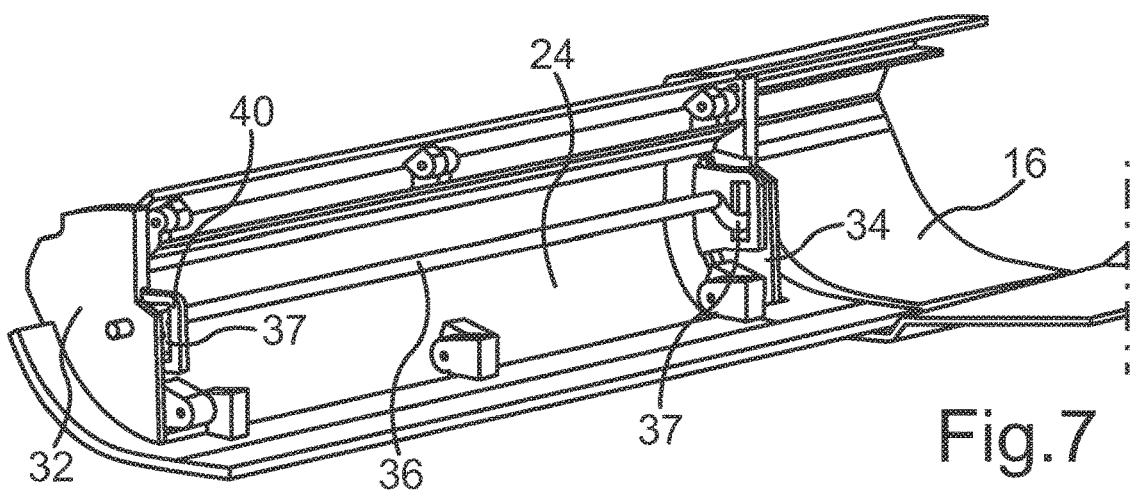
FIG. 7 is a perspective view of the cover device according to FIGS. 3 to 6, wherein the cover elements are shown after reaching the entry position.

Each of the two mobile first cover elements 24 arranged at a distance from one another in the longitudinal direction of the vehicle is displaceable in a manner described in more detail below between a covering position shown in FIG. 3, which is a first functional position in the exemplary embodiment of the cover device described here, and an entry position shown in FIG. 7, which is also referred to in the context of the invention as the second functional position. In this case, FIGS. 4 to 6 show intermediate positions of the first cover element 24, which same assumes in its displacement movement between the covering position (FIGS. 1 and 3) and the entry position (FIG. 7). Moreover, FIGS. 8 and 9 show the mobile first cover element 24 in both end positions thereof, namely the covering position in FIG. 8 and the entry position in FIG. 9.

As can be seen in this regard in particular by combined viewing of FIGS. 8 and 9, the inherently rigid, i.e., dimensionally stable, mobile first cover element 24 is pivotable about a bearing axis L running in the direction of extension and hence in, or at least substantially in, the longitudinal direction of the vehicle (x direction), which axis is located in a lower part region 26 of the first cover element 24. Accordingly, it can in particular also be seen by combined viewing of FIGS. 8 and 9 that a displacement of the first cover element 24 out of the covering position (FIG. 8) into the entry position (FIG. 9) leads to same being displaced inwards via the at least approximately whole vertical of the side sill 10 or the side cover 16 in the transverse direction of the vehicle (y direction), in order thereby to facilitate the entry and exit of a passenger through the corresponding door opening 14, by reducing the clear width of the sill covering 16 measured in the transverse direction of the vehicle or the space occupied by the first cover element 24 between the outside thereof and the outside of the sill. The "bar" in the region of the door opening 14, which the occupant has to negotiate when entering or exiting, is therefore correspondingly smaller and thus easier to negotiate without brushing over it with their clothing.

Furthermore, it can be seen in particular in FIG. 9 that an upper part region 28 of the mobile first cover element 24 is displaced as far towards the center of the vehicle until it at least approximately comes into abutment with a body element 63, which in the present case is a section of a body side wall, which, in the region of the side sill 10, at least partially covers the latter from above and, where appropriate, on the outside thereof.

As can be seen in particular from FIGS. 3 to 7, the cover device comprises a shell-shaped cover part 30 which has a corresponding curvature viewed in cross-section, into which the mobile first cover element 24 is integrated at least substantially flush in the covering position thereof. This cover part 30 is in this case arranged to overlap with the secured cover element 17 of the sill cover 16, here shown at the front, and also with central cover element 17 shown in FIG. 1. In the state of the cover device installed on the passenger vehicle, the cover part 30 is secured in a static manner to the side sill 10 or to a region close to a sill, such that when the first cover element 24 is pivoted about the bearing axis L between the covering and entry position thereof, the cover part 30 remains positionally fixed, i.e., immobile relative to the side sill 10.

Bearing webs 32, 34, which extend at least substantially in the vertical direction of the vehicle (z direction) and in the transverse direction of the vehicle (y direction), protrude from the cover part 30 at the front and rear of the cover element 24, viewed in the longitudinal extension of the cover element 24, such that an at least substantially U-shaped basic body for the fixed cover part 30 is produced overall, wherein the bearing webs 32, 34 form the side walls of the U-shaped basic body. In the exemplary embodiment of the cover device shown in the Figures, the bearing webs 32, 34 extend-viewed in cross section through the sill cover 16—over the entire height of the sill cover 16, in particular over the entire inside of the static cover element 17, as can readily be seen from FIGS. 8 and 9, and substantially fill most of the cross section of the sill cover 16 in this area, similar to partition panels.

A drive shaft 36 is mounted in a rotationally mobile manner on the bearing webs 32, 34, which drive shaft extends in, or at the very least substantially in, the longitudinal direction of the vehicle (x direction) and approximately horizontally. This drive shaft 36 comprises, in its respective end regions close to the bearing webs 32, 34, a corresponding U-shaped elbow 37, which is in engagement with an associated slit-shaped slotted link 38 of a corresponding link element 40, which in turn is secured on the inside of the cover element 24 at the front or rear end thereof. A rotation of the drive shaft 36, by the interaction of the respective elbow 37 with the corresponding slotted link 38 of the corresponding link element 40, accordingly effects the desired displacement movement of the pivotable first cover element 24 about the bearing axis L between the covering position according to FIGS. 3 and 8 and the entry position according to FIGS. 7 and 9.

Furthermore, it can be seen from FIGS. 3 to 7 that, in the present case, the bearing axis L of the first cover element 24 is defined by respective bearing elements 42, 44, which are secured on the one hand to the inside of the cover element 24 (bearing elements 42) and on the other hand to the inside of the cover part 30 (bearing elements 44). Each of these pairs of bearing elements 42, 44 is in this case connected to one another by a bolt or similar so as to move by pivoting, wherein the bolts of these pairs of bearing elements 42, 44 form the bearing axis L of the cover element 24. As can be seen in particular from FIG. 1, each of the first cover elements 24, mounted so as to move by pivoting on the cover part 30 or on associated cover parts 30, has in total three bearing points each with a pair of bearing elements 42, 44 and also the bolts coupling these to one another, wherein the bolts—viewed in the longitudinal extension direction of the sill cover 16—are all arranged flush with one another and thus define or form the bearing axis L. Each of these bearing points is thus formed as an articulation.

The number of bearing points can vary, such that, in another exemplary embodiment of the cover device, fewer than three or more than three bearing points can also be provided for the first cover element 24 that moves by pivoting.

As can moreover be seen in particular from FIGS. 8 and 9, a mobile second cover element 46 is displaceably held at the upper end region 27 of the cover element 24, which second cover element, in the covering position according to FIG. 7, extends along an upper end edge 48 of the first cover element 24 and which, in a manner described in more detail below, is also displaced in a positively controlled manner out of the covering position into the entry position—and back again—during the displacement movement of the first cover element 24 in its entry position according to FIG. 8. In the covering position according to FIG. 7, the mobile second cover element 46 is accordingly arranged on top of the first cover element 24. In the exemplary embodiment of the cover device depicted in the Figures, the second cover element 46 held so as to pivot on the first cover element 24 is designed as an angular strip member, that is to say that—as can be seen in particular from the cross-sectional depiction according to FIGS. 8 and 9—it is designed to be L shaped and extends horizontally outwards in the transverse direction of the vehicle (y direction) with a leg 50 and at least substantially vertically upwards in the vertical direction of the vehicle (z direction) with a leg 52. In the free space (receiving recess 70) partially framed by the legs 50, 52 and otherwise open to the outside, when the sill cover 16 is arranged in the covering position and the side door 12 is simultaneously closed, the lower edge region thereof protrudes at least partially inwards or is covered downwardly by the leg 50 of the angular strip element. It is clear that the first cover element 24 is considerably larger in terms of area than the second cover element 46 mounted thereon, wherein the required clear height of the second cover element 46 is largely determined by how far the first cover element 24 should be folded about the bearing axis L in the direction of a passenger compartment; this will be discussed in more detail below.

When the sill cover 16 is in the covering position, as depicted in FIG. 8, the leg 50 directly abuts the second cover element 46 at an upper longitudinal marginal edge 47 of the first cover element 24, preferably such that no edge is formed between these cover elements on the outside of the sill cover 16. The shaping of both cover elements 24, 46 is selected accordingly in the facing marginal regions thereof, as illustrated by way of example.

In the entry position according to FIG. 9, the second cover element 46 is arranged substantially below the upper end region 28 of the first cover element 24, wherein the leg 52 extends downwards in the vertical direction of the vehicle (z direction) and the leg 50 extends inwards in the transverse direction of the vehicle (y direction).

The displacement movement of the second cover element 46 between the two end positions thereof—the entry position and the covering position—is thus effected in a positively controlled manner by means of the slotted link 58 upon, or by, the displacement movement of the first cover element 24. In this case, the second cover element 46 is displaceable about a bearing axis W via respective bearing elements 54, 56, which are arranged inside the first cover element 24 (bearing element 54) or inside the second cover element 46 (bearing element 56). The bearing element 54 mounted or formed at least indirectly, preferably directly on the first cover element 24 is preferably formed in the manner of a bearing block and serves for the static, pivotable bearing of the other bearing element 56, which is mounted or formed at one end at least indirectly, preferably directly on the second cover element 46, and which in turn serves as a connecting member, which here is designed similarly to, or as, a coupler.

Each of the bearing webs 32, 34 additionally comprises a slotted link 58 on the respective inside facing the first cover element 24, which is the present case is designed approximately L-shaped and in which a bearing journal 60 of the respective associated coupler 56, which is connected to the second cover element, is in engagement. In this exemplary embodiment, the slotted link 58 is formed as a linear guide, and has a first straight guide portion 61 which—viewed in the longitudinal direction of the vehicle (x direction) according to the depiction in FIGS. 8 and 9—runs downwards from the outside at the top towards the inside, in the direction of the passenger compartment of the car. This therefore means that the linear guide formed by the first guide section of the slotted link 58 thus slopes obliquely downwards towards the center of the vehicle towards a roadway. A second guide portion of the slotted link 58 adjoins the end of the first guide portion 61 of the slotted link 58, which second guide portion, in this exemplary embodiment, is also designed as a linear guide and forms an angle of greater than 90° in this case with the first guide portion 61 of the slotted link 58. This means that the second guide portion runs obliquely inwards and upwards from one end of the first guide portion 61.

The second guide portion of the slotted link 58 ultimately serves only for tolerance compensation, i.e., the bearing journal 60 can run into the second guide portion when the cover elements 24, 46 are displaced into the second functional position. Ideally, after passing through the first guide portion of the slotted link 58, the bearing journal 60 only moves into the corner region between the two guide portions of the slotted link 58, which together have an L-shape, and remains pushed in there, while the second cover element 46 can continue to rotate about the bearing axis W.

Combined viewing of FIGS. 3 to 7 shows that in this case, the bearing journal 60 runs along the L-shaped slotted link 58 upon the displacement movement of the first cover element 24, and thus effects the displacement or pivoting movement of the second cover element 46 out of the covering position thereof into the entry position thereof.

It should be noted that, when the sill cover 16 is adjusted, the first cover element 24 is pivoted about a pivot axis which is static relative to the side sill 10 and thus static on the body, which was generally referred to above as bearing axis L. The individual points of the first cover element 24 thus move along an arcuate path K (FIG. 11) with the central point in the pivot axis/bearing axis L, which in this exemplary embodiment of the cover device intersects the movement path, formed as a linear guide, of the slotted link 58. The pivoting movement of the second cover element 46 mounted on the first cover element 24 so as to move about the pivot axis/bearing axis W, which second cover element in this case—unlike a mesh or woven fabric or the like—is formed as a dimensionally stable, i.e., at least predominantly rigid or stable structure in the form of an angular strip element, is superimposed over this movement. The pivoting movement of the second cover element 46, which forms a termination of the first cover element 24 towards the side door 14, is determined and initiated by the forced guidance of the coupler 56, forming a connecting member, in the slotted link 58. According to the illustration and view in FIGS. 8 and 9, pivoting the first cover element 24 clockwise about the L axis causes the second cover element 46 to be displaced translationally to the right and simultaneously to pivot clockwise about the W axis. This means, as can be readily seen from the Figures, that the second cover element 46 virtually rotates inwards in relation to the first cover element 24, which can be readily seen in a comparison of FIGS. 8, 9 and 12, and moves in relation to the upper longitudinal marginal edge 47 of the first cover element 24 to a lower position in the space between the first cover element 24 and the body element 63. The inward rotation of the second cover element 46 and thus also the adjustment of the first cover element 24 ends when, for example, one of the cover elements 24, 46 runs against a stop (for example 76, FIG. 13) and/or by switching off a motor of the drive A.

FIG. 13 shows such a stop 76 for delimiting the pivoting movement of the first and second cover elements 24, 46. In this exemplary embodiment, the stop 76 is designed in the form of a plate or small plate attached to the inside of the first cover element 24, which plate is arranged in the region close to the edge of the cover element 17 arranged secured to the sill and projects over the edge of the first cover element 24 and is thus—viewed in the pivoting direction from the entry position into its first functional position (covering position)—in an overlapping position with the immobile cover element 17 of the sill cover 16. The pivoting of the first cover element 24 and thus also of the second cover element 46 ends when the stop 71 moves against the inner wall of the positionally fixed cover element 17. This embodiment of the pivot angle delimitation of the first cover element 24 is particularly simple, cost-effective and functional. It readily enables the first cover element 24 in its first functional position (covering position) to be arranged steplessly, i.e., flush with its outside to the adjacently arranged cover element 17 or the outside thereof, without any further adjustment/alignment measures. For this purpose, only the two cover elements 17, 24 must have the same thickness in their adjacent regions and/or the stop 76 must be designed accordingly.

Figure 12:
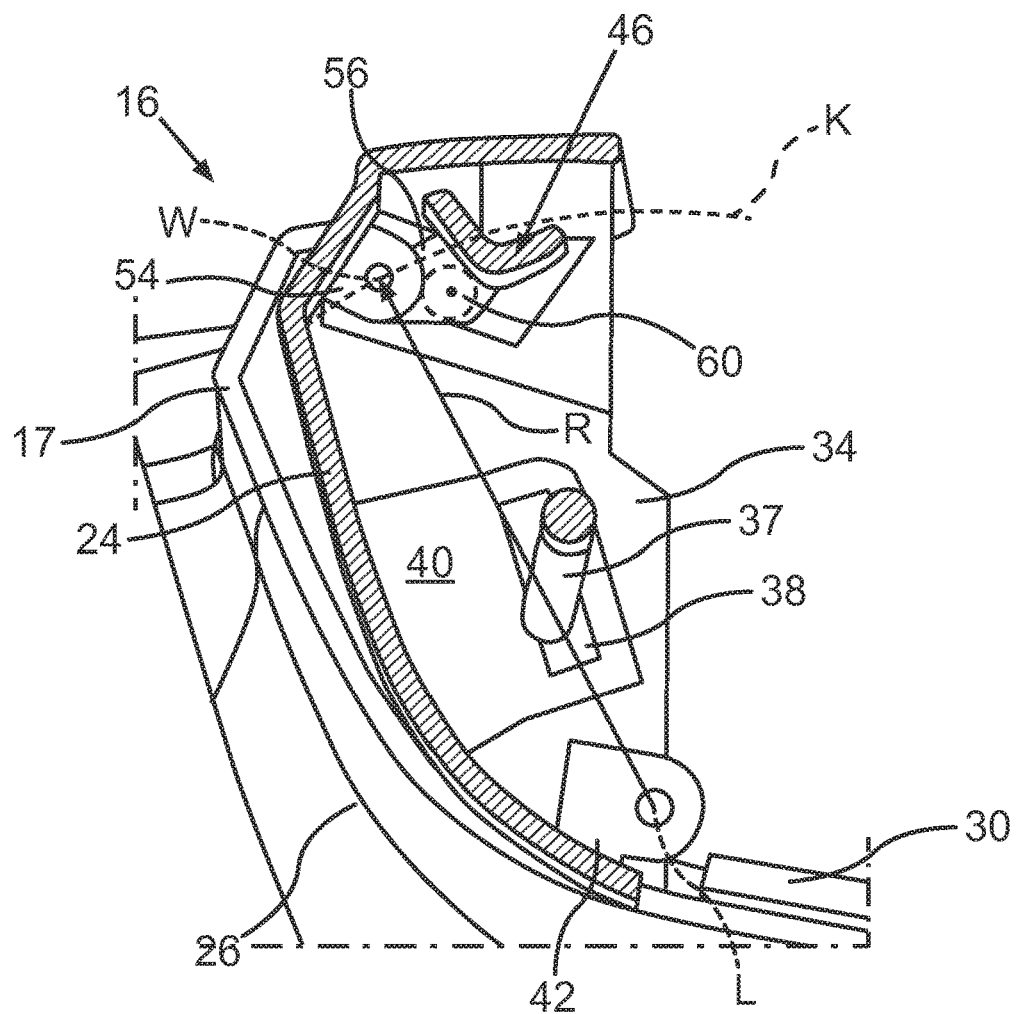
FIG. 12 is a sectional view through the cover device analogous to FIGS. 8, 9 and 11, wherein the mobile first and second cover elements are arranged in an intermediate position between the covering position and the entry position.

In the exemplary embodiment of the cover device shown in FIG. 9, the end of the pivoting of the cover elements 24, 46 could readily be achieved, for example, by stopping the longitudinal marginal edge 47 of the first cover element 24 against the body element 63 or by stopping the leg 52 of the second cover element 46 against the inner wall of the first cover element 24 or by stopping the leg 50 of the second cover element 46 against the body element 63. It is also conceivable that the end of the pivoting movement is achieved by stopping the drive shaft 36 at the end of the slotted link 38. In the exemplary embodiment of the cover device shown in FIG. 12, however, it is provided that in the first functional position of the sill cover 16, as shown in FIG. 12, the drive shaft 36 does not stop at the end of the slotted link 38, but that there is still a free space to the end of the slotted link 38. In this end position, the drive shaft 36 is arranged in a top dead center position, which means that if a force is applied to the sill cover 16 from outside, for example if a person steps on the sill cover arranged in a first functional position, the sill cover is not pushed into the second functional position. Instead, the drive shaft 36 continues to run in the slotted link 38 until it stops at the end thereof. This allows the first cover element 24 to be pushed back just a little bit until the drive A is completely blocked.

FIG. 8 makes it clear that a flexible cover element 62 is provided, one end 64 of which is arranged at least indirectly—namely in the present case by means of the second cover element 46—on the inherently rigid first cover element 24. In the present case, the other end 66 of the flexible cover element 62 is secured to the body element 63, the side wall of the motor vehicle. According to FIG. 8, when the sill cover 16 is arranged in the covering position, the flexible cover element 62 thus covers a free space 68 between the inherently rigid first cover element 24 which is in the covering position and the body element 63. The flexible covering element 62, which forms a top cover as described above, is in the present case made of a fabric material, for example a sheet of fabric such as that used for convertible tops. In the covering position, the flexible cover element 62 is arranged in a region of the side sill 10 covered by the associated vehicle door. With the sill cover 16 arranged in the covering position, the cover element 62 is virtually stretched open, i.e., it covers the free space 68 underneath it without wrinkles and thus prevents both the penetration of dirt and the inflow of air during operation of the vehicle, which could lead to disturbing noises.

The second, preferably dimensionally stable, cover element 46 is designed and arranged in its covering position according to FIG. 8 such that it has a receiving recess 70 for the lower door edge 18 of the associated side door 12. This ensures further improved protection of the lower door edge 18 and improved aerodynamics of the vehicle. By displacing the second cover element 46 between its covering position according to FIG. 8 and its entry position according to FIG. 9, it is also possible to displace the first cover element 24 even before the side door 12 is opened. The kinematics of the drive shaft 36 in conjunction with the respective slotted links 38 in the corresponding link elements 40 is designed in such a way that in both end positions—the entry position and the covering position—a dead center is overcome in order to hold the first cover element 24 securely in the corresponding positions. In one of these cases or both cases, a respective stop may be provided in order to additionally secure the position. Alternatively, it is possible to secure the end position protection by means of a self-retaining drive or the like. It is important to avoid unintentional adjustment of the first and second cover elements 24, 46 due to external forces, for example when the vehicle user steps on them when entering and/or exiting, or activation of the drive.

In the present case, the front and rear mobile first cover element 24 and the respectively associated second cover element 46 are driven electromotively by the drive unit A. For this purpose, the latter preferably has a motor designed as an electric motor, which is mounted by means of fastening elements on a holding device, which in turn is fixed in the sill cover, by, in the exemplary embodiment of the cover device shown in the Figures, being fastened on the inside of the central cover element fixed to the sill, for example by gluing, welding or by means of mechanical retaining elements.

In FIGS. 10 to 13, the flexible cover element 62 is omitted for the purpose of better visibility of the kinematics of the first and second cover elements 24, 46.

Figure 10:
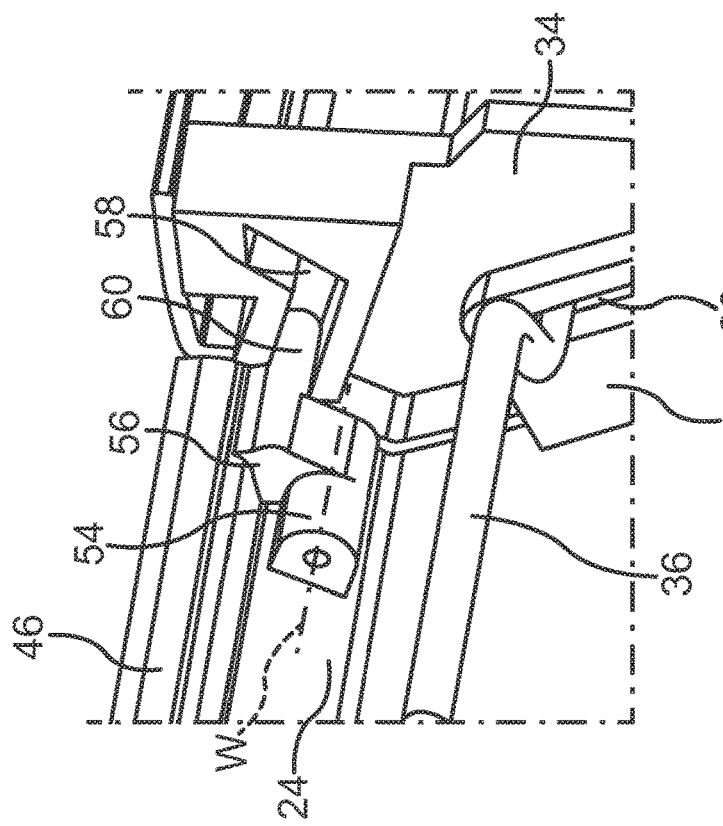
FIG. 10 is a perspective depiction of a section of an exemplary embodiment of kinematics for controlling the relative movement of the second cover element relative to the first cover element.
Figure 11:
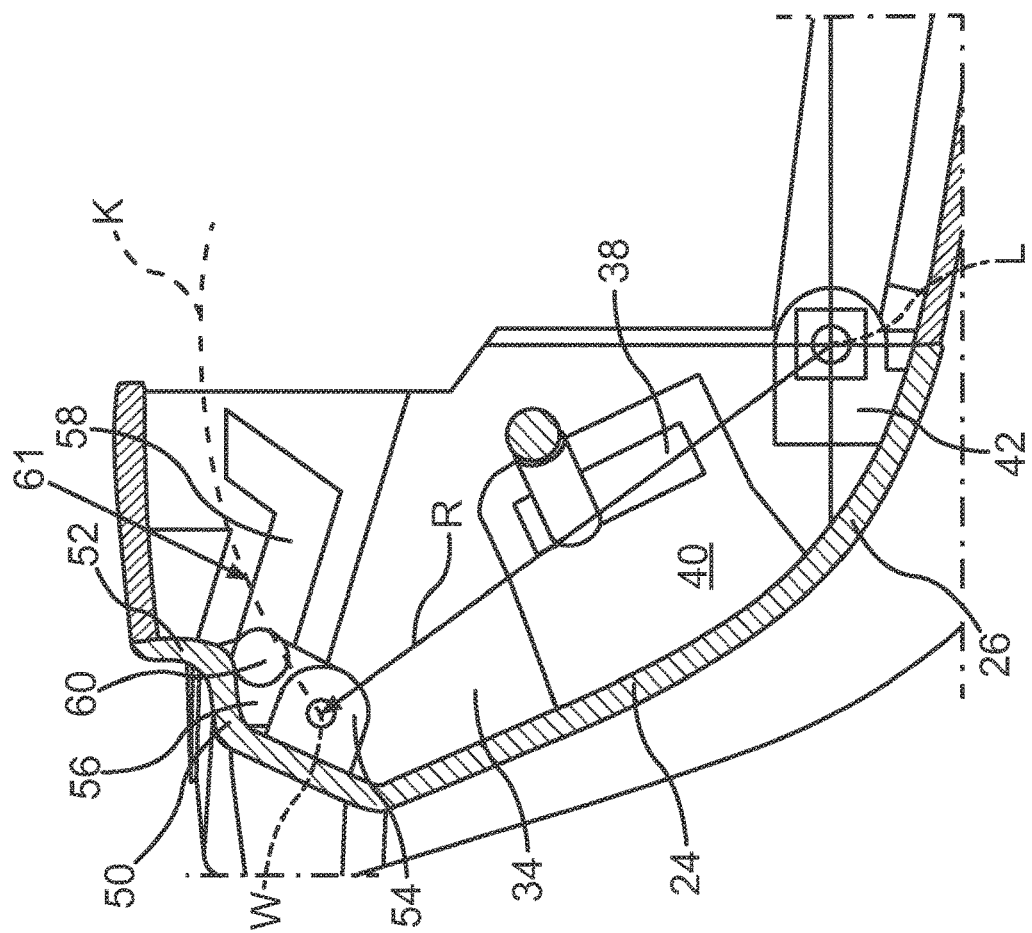
FIG. 11 is a sectional view through the cover device analogous to FIG. 8.

FIG. 10 shows a perspective view of a section of the cover device in the region of the bearing web 34, which has a slotted link 58. It can be seen that the bearing web 34 has a greater thickness in the region of the slotted link 58 than in a portion located therebelow. The bearing web 34 can in this case be formed in one piece, as illustrated.

FIG. 13 shows a perspective view of a section of the cover device on the other bearing web 32, which is also provided with a slotted link 58. It can be seen that the doubling-up of the material of the bearing web 32 in the region of the slotted link 58 is produced here by a separate plate-shaped part having the slotted link 58.

FIG. 12 shows particularly clearly how the second cover element 46 pivots when it is displaced into the or its second functional position and is simultaneously lowered from a higher level to a lower level and simultaneously translationally displaced inwards in the transverse direction of the vehicle. As soon as the bearing journal 60 moves into the corner between the two guide sections of the slotted link 58, the second cover element 46 will only continue to pivot about the axis W if the first cover element 24 continues to pivot about the axis L.

It should be noted that, in the particularly advantageous embodiment of the cover device described in the Figures, the mobile second cover element 46 is forcibly guided at each of its two longitudinal ends by means of a respective slotted link 58. In principle, however, it is also possible that the second cover element 46 is only forcibly guided by a slotted link 58.

The invention claimed is:

1. A cover device for a side sill of a passenger vehicle, comprising:
    a sill cover which includes a first cover element and a second cover element which are disposable in a length region of the side sill below a door opening of the passenger vehicle and are coupled moveably to one another; and
    a drive unit, wherein the first and second cover elements are jointly displaceable between a first functional position and a second functional position by the drive unit, wherein the first cover element is pivotable about a first axis and the second cover element is displaceable about a second axis;
    wherein the second cover element is pivotable about the second axis via a bearing device on the first cover element;

and wherein a displacement movement of the second cover element relative to the first cover element is controlled by a slotted link.

2. The cover device according to claim 1, wherein the bearing device comprises a coupler which is pivotable about the second axis on the first cover element and is connected to the second cover element.

3. The cover device according to claim 2, wherein the coupler is guided by the slotted link.

4. The cover device according to claim 1, wherein the slotted link has a guide portion Which as viewed in a longitudinal direction of the passenger vehicle runs obliquely downward from an outside at a top toward a center of the passenger vehicle.

5. The cover device according to claim 1, wherein the slotted link is provided with a bearing web disposed positionally fixed relative to the side sill.

6. The cover device according to claim 1, wherein the second axis is provided in a static manner on the first cover element.

7. The cover device according to claim 1, wherein the first cover element is displaceable about the first axis along an arcuate path with a radius and wherein the arcuate path intersects the slotted link.

8. The cover device according to claim 1, wherein in the first functional position the second axis is disposed below the slotted link.

9. The cover device according to claim 1, wherein in the second functional position the second axis is disposed above a guide portion of the slotted link which runs obliquely downward.

10. The cover device according to claim 1, wherein upon a displacement from the first functional position into the second functional position and/or from the second functional position into the first functional position, the first and second cover elements respectively pivot in a same direction about the respective axis.

11. The cover device according to claim 1, wherein in the second functional position, an upper longitudinal marginal edge of the first cover element as viewed in a vertical direction of the passenger vehicle is disposed above the second cover element.

12. A passenger vehicle comprising a side sill with the cover device according to claim 1.

* * * * *